United States Patent
Abu-Saba et al.

(10) Patent No.: US 10,521,422 B2
(45) Date of Patent: *Dec. 31, 2019

(54) QUESTION PRE-PROCESSING IN A QUESTION AND ANSWER SYSTEM

(71) Applicant: International Business Machines Corporation, Armonk, NY (US)

(72) Inventors: Maria Abu-Saba, Dubai (AE); David M. Curran, Dublin (IE); Liam Harpur, Dublin (IE); Simon P. O'Doherty, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 15/622,674

(22) Filed: Jun. 14, 2017

(65) Prior Publication Data

US 2018/0253432 A1 Sep. 6, 2018

Related U.S. Application Data

(63) Continuation of application No. 15/448,811, filed on Mar. 3, 2017.

(51) Int. Cl.
*G06F 16/00* (2019.01)
*G06F 16/2452* (2019.01)
(Continued)

(52) U.S. Cl.
CPC .. *G06F 16/24522* (2019.01); *G06F 16/24578* (2019.01); *G06F 16/285* (2019.01); *G06F 16/3329* (2019.01); *G06F 16/90332* (2019.01)

(58) Field of Classification Search
CPC .............. G09B 7/00; G06F 16/24522; G06F 16/24578; G06F 16/285; G06F 16/3329; G06F 16/90332; G06F 16/335

See application file for complete search history.

(56) References Cited

U.S. PATENT DOCUMENTS

| | | | |
|---|---|---|---|
| 6,938,068 B1 * | 8/2005 | Kraft | G06Q 10/10 709/203 |
| 7,664,631 B2 | 2/2010 | Sugihara et al. | |

(Continued)

FOREIGN PATENT DOCUMENTS

| JP | 92005208782 A | 8/2005 |
|---|---|---|
| JP | 2006127089 A | 5/2006 |
| WO | WO2013/155619 A1 | 10/2013 |

OTHER PUBLICATIONS

List of IBM Patents or Patent Applications Treated as Related, Nov. 1, 2017, 2 pages.

(Continued)

*Primary Examiner* — Merilyn P Nguyen
(74) *Attorney, Agent, or Firm* — Stephen J. Walder, Jr.; Diana R. Gerhardt

(57) ABSTRACT

Mechanisms are provided for assembling natural language user inputs into questions for a question-and-answer (QA) system. The mechanisms initialize a timer to a threshold amount of time, receive a first input of content-bearing natural language from a user computing device, and initiate running of the timer in response. The mechanisms determine whether a second input of content-bearing natural language is received from the user computing device prior to the threshold amount of time being reached by the timer. If so, the second input is grouped with the first input to generate a question comprising content of both the first input and the second input, and the timer is reset. In response to the timer reaching the threshold without further input from the user computing device, the question is provided to the QA system as an input question for processing by the QA system.

10 Claims, 9 Drawing Sheets

(51) Int. Cl.
  *G06F 16/28*    (2019.01)
  *G06F 16/2457*  (2019.01)
  *G06F 16/9032*  (2019.01)
  *G06F 16/332*   (2019.01)

(56) References Cited

U.S. PATENT DOCUMENTS

| | | | |
|---|---|---|---|
| 8,204,751 | B1 | 6/2012 | Di Fabbrizio et al. |
| 8,275,803 | B2 | 9/2012 | Brown et al. |
| 8,346,563 | B1* | 1/2013 | Hjelm ................. G10L 15/1822 379/88.01 |
| 8,577,671 | B1 | 11/2013 | Barve et al. |
| 9,251,469 | B2* | 2/2016 | Alkov .................... G06N 5/022 |
| 9,269,354 | B2 | 2/2016 | Gandrabur et al. |
| 9,424,233 | B2 | 8/2016 | Barve et al. |
| 9,462,340 | B1* | 10/2016 | Mathurin ....... H04N 21/234336 |
| 10,185,542 | B2* | 1/2019 | Carson .................... G06F 3/167 |
| 10,222,961 | B2* | 3/2019 | Rosenberg ............. H04L 67/12 |
| 10,347,247 | B2* | 7/2019 | Bhaya ..................... G10L 15/22 |
| 2004/0014016 | A1* | 1/2004 | Popeck .................... G09B 7/00 434/322 |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |
| 2012/0088222 | A1* | 4/2012 | Considine ................ G09B 5/00 434/362 |
| 2012/0288845 | A1* | 11/2012 | Kumar GL ............. G09B 7/06 434/362 |
| 2013/0007055 | A1 | 1/2013 | Brown et al. |
| 2013/0018652 | A1 | 1/2013 | Ferrucci et al. |
| 2013/0066886 | A1 | 3/2013 | Bagchi et al. |
| 2014/0100858 | A1* | 4/2014 | Grollmuss ............. G06Q 50/22 705/2 |
| 2014/0257792 | A1 | 9/2014 | Gandrabur et al. |
| 2015/0200893 | A1* | 7/2015 | Harris .................. G06Q 10/101 709/206 |
| 2016/0170957 | A1 | 6/2016 | Allen et al. |
| 2017/0316326 | A1* | 11/2017 | Ricketts ................. G06Q 10/00 |

OTHER PUBLICATIONS

"Dialog, IBM Watson Developer Cloud", https://www.ibm.com/watson/developercloud/dialog.html, Accessed from the Internet, Mar. 3, 2017, 5 pages.

"Language Understanding", Microsoft Cognitive Services, https://www.luis.ai, Accessed from the Internet, Mar. 3, 2017, 5 pages.

Bot Users/Slack, "What are bot users?", Accessed from the Internet, https://api.slack.com/bot-users, Mar. 3, 2017, 16 pages.

Chai, Joyce Y. et al., "Discourse Structure for Context Question Answering", Proceedings of the Workshop on Pragmatics of Question Answering at HLT-NAACL. vol. 2004, Jan. 2004, 8 pages.

High, Rob, "The Era of Cognitive Systems: An Inside Look at IBM Watson and How it Works", IBM Corporation, Redbooks, Dec. 12, 2012, 16 pages.

IBM API Connect, "A comprehensive solution to manage your entire API lifecycle from creation to management.", http://www-03.ibm.com/software/products/en/api-connect, Accessed from the Internet, Oct. 31, 2017, 5 pages.

IPSOFT/AMELIA, "Cognitive Science applied to business", Accessed from the Internet, http://www.ipsoft.com, Mar. 3, 2017, 5 pages.

Kato, Tsuneaki et al., "Handling Information Access Dialogue through QA Technologies—A novel challenge for open-domain question answering", Proceedings of the HLT-NAACL 2004 workshop on pragmatics of question answering. May 2004, 8 pages.

Kennedy, Christopher et al., "Anaphora for Everyone: Pronominal Anaphora Resolution without a Parser", COLING '96 Proceedings of the 16th conference on Computational Linguistics—vol. 1, Aug. 5-9, 1996, 6 pages.

McCord, M.C. et al., "Deep parsing in Watson", IBM J. Res. & Dev. vol. 56 No. 3/4 Paper 3, May/Jul. 2012, pp. 3:1-3:15.

McCusker, James P. et al., "What is a Knowledge Graph", Accessed from the Internet, https://www.authorea.com/users/6341/articles/107281-what-is-a-knowledge-graph/_show_article, Nov. 1, 2017, 8 pages.

Silvia/Intelligence on Command, "Intelligence on Command", Accessed from the Internet, http://www.cognitivecode.com/#features, Mar. 3, 2017, 7 pages.

Wit Landing, "Natural Language for Developers", Accessed from the Internet, https://wit.ai, Mar. 3, 2017, 3 pages.

Yuan, Michael J., "Watson and healthcare, How natural language processing and semantic search could revolutionize clinical decision support", IBM Corporation, IBM developerWorks, http://www.ibm.com/developerworks/industry/library/ind-watson/, Apr. 12, 2011, 14 pages.

Yumi Bot, "Do you want to make an app?", Accessed from the Internet, http://www.yumibot.com, Oct. 31, 2017, 4 pages.

* cited by examiner

QUESTION PRE-PROCESSING IN A QUESTION AND ANSWER SYSTEM

This application is a continuation of application Ser. No. 15/448,811, filed Mar. 3, 2017, status pending.

BACKGROUND

The present disclosure relates generally to a question and answer system and more particularly to pre-processing questions before they are input into such a system.

Cognitive question/answer (QA) systems analyze a question posed by a user in natural language, access a database to return results indicative of the most probable answer to the input question, and then determine and formulate an answer for the user. In operation, users submit one or more questions through an application's user interface (UI) or application programming interface (API) to the QA system. In turn, the questions are processed to generate answers, which are then returned to the user. QA systems provide automated mechanisms for searching through large sets of sources of content, e.g., electronic documents, and analyze them with regard to an input question to determine an answer to the question and a confidence measure as to how accurate an answer is for answering the input question. Examples, of QA systems are Siri (trademark) from Apple Corporation, Cortana (trademark) from Microsoft Corporation, and the question answering pipeline of IBM Watson (trademark) from IBM Corporation.

The IBM Watson system is an application of advanced natural language processing, information retrieval, knowledge representation and reasoning, and machine learning technologies to the field of open domain question answering. The IBM Watson system is built on IBM's DeepQA (trademark) technology used for hypothesis generation, massive evidence gathering, analysis, and scoring. DeepQA takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Standard QA systems work with single QA pairs, i.e. a specific question is paired with a specific answer in a one-to-one relationship. The system compiles a database of QA pairs, e.g., by ingesting content from one or more corpora comprising content from various data sources, or from training corpora and processes, so that when a user asks a question, the same question is searched for in the database, which if found has a corresponding paired answer, which can then be provided as a response to the user's question. However humans in natural language, e.g., when talking and also when inputting text through a keyboard, often tend not to pose a query as a single cohesive sentence. Rather, humans tend to formulate a query in the form of several sentences, or sentence fragments, some of which may be linguistically formulated as questions and others as statements intended to further specify the nature of the questions.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions which are executed by the processor to configure the data processing system to implement a question compiler for assembling natural language user inputs into questions for a question-and-answer (QA) system. The method comprises initializing, by the question compiler of the data processing system, a timer to a threshold amount of time, receiving, in a queue of the question compiler, a first input of content-bearing natural language from the user computing device, and initiating, by the question compiler, running of the timer in response to receiving the first input of content-bearing natural language.

The method further comprises determining, by the question compiler, whether or not a second input of content-bearing natural language is received from the user computing device prior to the threshold amount of time being reached by the timer. Moreover, the method comprises, in response to receiving the second input of content-bearing natural language prior to the threshold amount of time being reached by the timer, grouping the second input with the first input to generate a question comprising content of both the first input and the second input, and resetting the running of the timer. In addition, the method comprises providing, by the question compiler, in response to the timer reaching the threshold amount of time without further input being received from the user computing device, the question to the QA system as an input question for processing by the QA system.

The method as discussed above provides the advantage that users who formulate questions as a series of sentence fragments, that may or may not be posed in a question format, may have the series of sentence fragments recognized automatically by the question compiler as relating to a same question and the question input to the QA system in such a way that the QA system is able to process the question correctly and provide an accurate answer. This avoids the problem of known mechanisms that would consider each separate fragment as a separate, and unrelated, query.

In some illustrative embodiments, the method further comprises, in response to one or more further inputs being received by the question compiler prior to the timer reaching the threshold amount of time, comparing, by the question compiler, the one or more further inputs to each other or to the first and second inputs to determine if they are semantically related, and grouping together, by the question compiler, each of the one or more further inputs, the first input, or the second input that are determined to be semantically related to each other into sets of grouped inputs. In such an embodiment, providing the question to the QA system comprises outputting a group of questions to the QA system comprising at least one question, wherein each question in the group of questions is formed by one set of grouped inputs in the sets of grouped inputs. This functionality allows for the recognition of fragments that are semantically related and thus, are part of the same question being composed by the user.

In some illustrative embodiments, a determination of a semantic relationship between inputs is based on a confidence score of similarity between the respective contents of the inputs. In one or more illustrative embodiments, the confidence score is compounded with elapsed time between inputs being compared, wherein larger elapsed times between inputs being compared reduce the confidence score. This functionality allows for a more accurate determination of semantic relatedness of fragments as those that are received with larger separations of time are more likely to not be semantically related and those that are received with smaller separations of time are more likely to be semantically related.

In some illustrative embodiments, the threshold amount of time is determined based on an analysis of an average time difference between reception times of inputs determined to belong to a single same question. In one or more illustrative embodiments, the threshold amount of time is determined based on an analysis of an average time difference between reception times of pairs of inputs determined to be a last input associated with one question and a first input associated with a next question. This functionality allows for the customization of the threshold amount of time for a particular user based on the way that the user provides input fragments which are received by the question compiler.

In some illustrative embodiments, the threshold amount of time is determined based on an analysis of an average time difference between reception times of inputs determined to belong to a single same question, and an average time difference between reception times of pairs of inputs determined to be a last input associated with one question and a first input associated with a next question. Moreover, in some illustrative embodiments, the threshold amount of time is determined based on at least one of a time of day, a user status, or a domain of questions. This functionality allows for customization of the threshold amount of time based on various factors so as to accommodate different conditions.

Furthermore, in some illustrative embodiments, in response to one or more further inputs being received by the question compiler prior to the timer reaching the threshold amount of time, the method further comprises comparing, by the question compiler, the one or more further inputs to previous inputs associated with previously generated questions in a same question-and-answer (QA) session between the user computing device and the QA system to determine if they are semantically related. Moreover, in such an embodiment, in response to the one or more further inputs being semantically related to a previous input associated with a previously generated question, the method comprises associating the previous input associated with the previously generated question with a group corresponding to a further input with which it is semantically related. This functionality allows for association of fragments of fragments in one grouping of fragments associated with a first question to be also associated with another question grouping if they are semantically related.

In some illustrative embodiments, in response to one or more further inputs being received by the question compiler prior to the timer reaching the threshold amount of time, the method comprises comparing, by the question compiler, the one or more further inputs to previous inputs from a same user submitted during a previous question-and-answer (QA) session between the user computing device and the QA system to determine if they are semantically related. In such embodiments, the method further comprises, in response to the one or more further inputs being semantically related to a previous input associated with a previously generated question, associating the previous input with a group corresponding to a further input with which it is semantically related. This functionality allows for cross QA session association of fragments, such as when a user leaves a session and returns to that session or generates a new session related to the first.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

For example, in some illustrative embodiments, a computer program product comprising a computer readable storage medium having a computer readable program stored therein is provided. The computer readable program, when executed on a computing device, causes the computing device to: initialize a timer to a threshold amount of time; receive a first input of content-bearing natural language from the user computing device; initiate running of the timer in response to receiving the first input of content-bearing natural language; determine whether or not a second input of content-bearing natural language is received from the user computing device prior to the threshold amount of time being reached by the timer; in response to receiving the second input of content-bearing natural language prior to the threshold amount of time being reached by the timer, group the second input with the first input to generate a question comprising content of both the first input and the second input, and reset the running of the timer; and provide, in response to the timer reaching the threshold amount of time without further input being received from the user computing device, the question to the QA system as an input question for processing by the QA system.

In yet other illustrative embodiments, a system/apparatus is provided. The system/apparatus may comprise one or more processors and a memory coupled to the one or more processors. The memory may comprise instructions which, when executed by the one or more processors, cause the one or more processors to be specifically configured to perform various ones of, and combinations of, the operations outlined above with regard to the method illustrative embodiment.

For example, in some illustrative embodiments, an apparatus is provided that comprises a processor and a memory coupled to the processor, where the memory comprises instructions which, when executed by the processor, cause the processor to: initialize a timer to a threshold amount of time; receive a first input of content-bearing natural language from the user computing device; initiate running of the timer in response to receiving the first input of content-bearing natural language; determine whether or not a second input of content-bearing natural language is received from the user computing device prior to the threshold amount of time being reached by the timer; in response to receiving the second input of content-bearing natural language prior to the threshold amount of time being reached by the timer, group the second input with the first input to generate a question comprising content of both the first input and the second input, and reset the running of the timer; and provide, in response to the timer reaching the threshold amount of time without further input being received from the user computing device, the question to the QA system as an input question for processing by the QA system.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
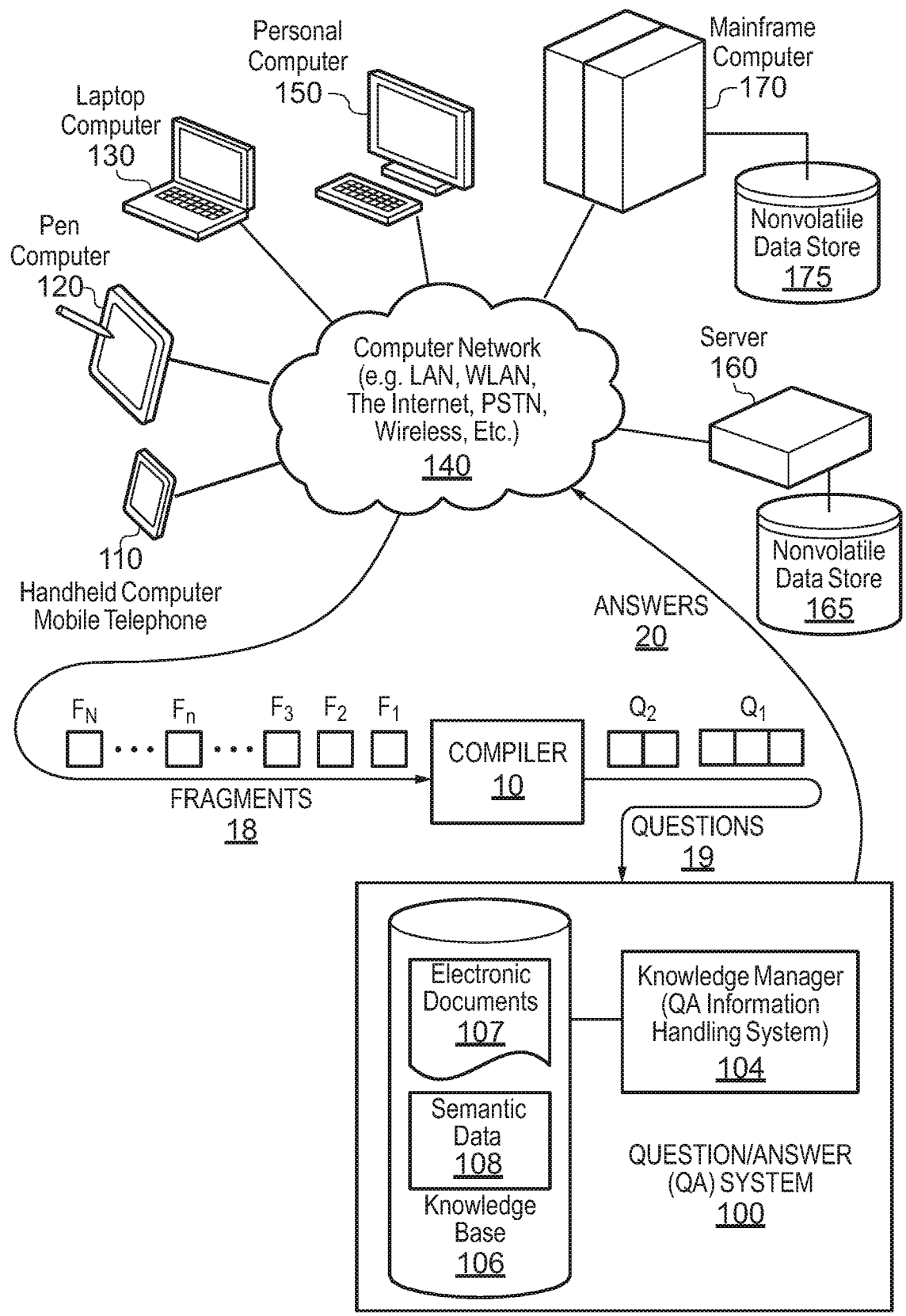
FIG. 1 depicts an example computer network comprising a QA system and various user devices capable of supporting QA sessions and includes a question compiler for assembling user inputs of natural language into questions in accordance with one illustrative embodiment.

As noted above, known QA systems work with single QA pairs, however humans often do not pose queries as a single cohesive sentence but may formulate a query in the form of several sentences or sentence fragments, some of which may be linguistically formulated as questions and others as statements intended to further specify the nature of the questions. Take the following example dialog between a robot, or "bot", and a human in a QA system:

| HUMAN | How can I help you? | BOT |
|---|---|---|
| | 1. I would like to know what fees are related to my business. | |
| | 2. Are taxes included? | |
| | 3. I run a toy store. | |
| | 4. Sam wanted to know. | |
| | 5. About the paperwork | |

In the central column of the above-table, each left-justified line is a discrete input from the human user as speech or text. There are five discrete user inputs in total. A simple conversation system would take each line of input as a question, and answer it, which we as humans know would be inappropriate. An answer to line 1 would give a generic response, but conversational self-repair in line 3 would provide a more accurate answer. An answer to line 2 would not be possible without recognizing a link to line 1, i.e. that line 2 is an anaphora question in that "taxes" refers back to "fees" in line 1. At line 4 a new subject is introduced, but an answer is not possible without context. Context is then provided in line 5, which allows line 4 to be answered. Helpful deductions are made by relating "toy store" to "business", and "taxes" to "fees". However, in line 4, does "Sam wanting to know" relate to the previous lines 1-3 or the following line 5? In other words, is line 5 a cataphora question, i.e. contains as-yet to be clarified reference to "that", or is line 5 merely a continuation of line 4 with lines 3 & 4 forming a single sentence with "that" being an anaphora to fees/taxes?

According to one aspect of the illustrative embodiments described herein, there is provided a computer-automated mechanism for assembling natural language user inputs into questions for a question-and-answer (QA) system. In accordance with this illustrative embodiment, the mechanism operations comprise initiating a QA session with a user and performing assembly of a group of questions from user input of natural language fragments. The group of questions assembled from the inputs may only be one question, but in some instances is two or more questions. The assembled question or questions are output to a QA system, which then responds with answers. The question and answer cycle can then repeat within the QA session, i.e. the QA session continues by performing another assembly and then outputting the resulting question or questions.

In this illustrative embodiment, performing assembly of the group of questions is carried out until a threshold amount of time is reached. Reaching the time threshold, as monitored by a timer, is what triggers the question to be output. The question assembly is performed by setting the timer to the desired time threshold. When a first input of content-bearing natural language is received from the user, the timer is started. The system then waits to receive a further input of content-bearing natural language from the user. If a further input is received before the timer runs out, the timer is reset to its initial value, or an adaptively varied value, and the system waits again to receive still further inputs of content-bearing natural language from the user. If multiple inputs are received, pairwise comparisons are made between those inputs to determine if they are semantically related. Any inputs determined to be semantically related are grouped together so that they can be aggregated into the same question.

Determination of semantic relationships between inputs can be based on a confidence score of similarity between the inputs' respective contents. The confidence score in some embodiments is compounded with elapsed time between the inputs being compared in the sense that larger elapsed times reduce the confidence score. That is the confidence score threshold needed to result in a determination that there is a semantic relationship between the latest input and an earlier input is higher for an older input than a newer input. This weighting according to age can be implemented in a gradual fashion such as, for example, only a few percent reduction (e.g. 2%, 5%, 10% or 20% per input), or other suitable graduated weighting for the particular implementation. For example, if there were a 10% reduction per input, and assuming that comparing the current input with the immediately previous input is given a weighting of 1.0, then comparing the current input with, for example, three inputs prior to the immediately previous input results in a weighting of 0.7 being applied, and no inputs older than nine before the immediately previous input, are considered. On the other hand, if a 25% reduction per input were applied then no inputs older than three, before the immediately previous input, are considered. As an alternative to decrementing the weighting based on the numbering of inputs, this may be done based on real time, i.e. the real time difference between receipt of (or generation of) the two inputs being compared. It should be appreciated that these are only examples and other weighting schemes may be utilized without departing from the spirit and scope of the present invention.

The threshold amount of time in some embodiments is determined based on an analysis of an average time difference between receipt of inputs deemed to belong to a single question. For example, the threshold amount of time may be set to this average time difference plus a constant time, such as 0.5, 1, 1.5 or 2 seconds, or plus a percentage, such as provided by a multiplier of 1.1, 1.2, 1.3, 1.4, 1.5, 1.6, 1.7, 1.8, 1.9, 2, 2.5 or 3 of this average time difference.

In other embodiments, the threshold amount of time is determined based on an analysis of an average time difference between receipt of pairs of inputs deemed to be the last input of one question and the first input of the next question. For example, the threshold amount of time may be set to this average time difference minus a constant time, such as 0.5, 1, 1.5 or 2 seconds, or minus a percentage, such as provided by a multiplier of 0.1, 0.2, 0.3, 0.4, 0.5, 0.6, 0.7, 0.8 or 0.9 of this average time difference.

Both these approaches may be combined in other embodiments, so that the threshold amount of time is determined based on an analysis of an average time difference between receipt of inputs deemed to belong to a single question, and average time difference between receipt of pairs of inputs deemed to be the last input of one question and the first input of the next question. That is, the method in such an embodiment distinguishes between two types of time difference, the time difference between inputs within a question, i.e. intra-question, and time difference between the last input of one question and the first input of the next, i.e. inter-question. For example, if the average intra-question time difference between inputs is 'x' and the average inter-question time difference is 'y', then the threshold amount of time should be set at some intermediate value part way between 'x' and 'y', such as midway between, i.e. (x+y)/2.

Any one of the averages referred to in the preceding paragraphs that are used to set the threshold time or times for the timer may be a rolling average, for example a rolling average computed during the current QA session. For example, the QA session may start with an initial intra- and inter-question time difference. The intra-question time is then re-set to the time difference between the first two question fragments and the inter-question wait time is re-set to the time difference between the first and second questions. Thereafter during the session, the threshold times are modified by continually computing rolling averages for the intra-question and/or inter-question time difference.

The continual recalculating and resetting of the threshold time may be conveniently done after each group of questions is assembled. However, it is also possible to recalculate the threshold time after each fragment is input. Thus, if several fragments are input in one session, then after each fragment is input, the timer may be reset to a different threshold time, i.e. the threshold time need not be fixed for a given question input but may vary from fragment to fragment. Resetting the timer to the threshold time after each fragment is input does not mean that the timer is reset to the same threshold time and in fact may be reset to different threshold times. In other illustrative embodiments, the rolling average may extend to cover one or more previous QA sessions, which may be immediately preceding QA sessions for the current user.

The setting of the time threshold is such that the time threshold is set to a time which is long enough to capture successive inputs which the user intends to be submitted as one question, but short enough to detect the user having been silent for a period of time (which indicates that the user has finished inputting his or her question and is now waiting for an answer). Because this time an adjustable time threshold which varies according to user behavior, in particular recent behavior.

The threshold amount of time can also be determined to vary with factors such as, for example, time of day, user status (e.g., tired or alert), the domain of the questions, the sentiment of the inputs, the tone of the inputs, and other various factors determined to be pertinent to the particular implementation. For example, if the QA system is being questioned about a complicated subject domain or the sentiment is negative, then it might be expected that the user will take longer to formulate questions.

As well as determining if there are any semantic relationships between any ones of the inputs in the current assembly, the illustrative embodiments may also look further back to determine if there are any semantic relationships to inputs from previous assemblies in the same QA session. If any such semantic relationships are found, then the input from the previous assembly that has been identified as having a semantic relationship to an input in the current assembly is treated as if it belonged to the current assembly. A similar approach can also be applied across QA sessions to determine if there are any semantic relationships to inputs from the same user that were input in previous QA sessions, and, if yes, treating those inputs as belonging to the current assembly.

In some illustrative embodiments, the content-bearing information comprises at least one of entity information and intent information. In natural language processing, entities are conventionally classified into categories of persons, organizations, locations, or miscellaneous. It will be understood that the natural language input may be text input through a keyboard, or speech input that has been converted to text, for example by speech recognition software and/or automated lip reading.

As noted above, as part of initiating a QA session with a user, the threshold amount of time may be set in accordance with an illustrative embodiment of the present invention. This can be done from history for that user, e.g., by looking up a value stored from a previous QA session for that user, deduced from history of a previous QA session for that user, or the like. Alternatively, in some illustrative embodiments, a generic default setting may be applied to provide an initial setting. According to another aspect of the disclosure, there is provided a computer-automated mechanism for user interaction with a question-and-answer (QA) system, where the mechanism performs operations of providing a QA system including a knowledge base and assembling natural language user inputs into questions for the QA system according to the methodology of one or more of the illustrative embodiments described above. Moreover, the mechanism may further perform operations of supplying each question to the QA system, processing each question with reference to a knowledge base to generate an answer, and transmitting each answer to the user.

A computer program is also provided, which may be stored on a computer readable medium and loadable into the internal memory of a digital computer. The computer program comprises software code portions, which when run on a computer, cause the computing device to perform the operations of one or more of the illustrative embodiments previously outlined above and set forth herein. A user computing device loaded with such a computer program is also provided in some illustrative embodiments. A computing device hosting a question-and-answer system and loaded with such a computer program is also provided in some illustrative embodiments. In other words, the computer program that provides the functionality for assembling natural language user inputs into questions for a QA system may be hosted in the user computing device, in the QA system device, or one or more other computing devices of a distributed data network. Alternatively, this functionality may be hosted by one or more other computing devices which may then be functionally arranged as a conduit between the user computing device and the QA system through which the user inputs were routed. Other aspects of the disclosure relate to a computer program product storing any one of the above-mentioned computer programs.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

A user device for communicating QA dialog according to one or more of the illustrative embodiments of the present invention may be any suitable computing device, for example a mobile phone (smartphone), phablet, tablet, laptop computer, gaming console, personal computer, smart television, media player, or the like. The computing device may be a user equipment as defined by one or more telecommunications standards. The computing device may be portable, e.g., a handheld computing device, or fixed. In short, any known or later developed computing device having data processing capability may be used as one or more of the computing devices that are specifically configured, in accordance with one or more of the illustrative embodiments set forth herein, to perform the specific operations described herein to implement the features of the illustrative embodiments.

FIG. 1 depicts an example computer network comprising a QA system and various user devices capable of supporting QA sessions and includes a question compiler for assembling user inputs of natural language into questions in accordance with one illustrative embodiment. As shown in FIG. 1, a question-and-answer (QA) system 100 and various computer devices 110, 120, 130, 150, 160, 170 capable of supporting QA sessions between a user of these computing devices and the QA system 100 are provided. For example, a user may use a handheld computer mobile telephone (aka smartphone) 110, pen or tablet computer 120, laptop computer 130, personal computer 150, server 160 or mainframe computer 170 to interact with the QA system 100 in a QA session. The various computing devices are connected to each other via one or more computer, or data processing, networks 140. Some of the information processing systems may use separate nonvolatile data stores (e.g., server 160 utilizes nonvolatile data store 165, and mainframe computer 170 utilizes nonvolatile data store 175).

The QA system 100 includes a knowledge manager 104 that is connected to a knowledge base 106 and configured to provide QA generation functionality for one or more content users who submit questions from a user computer device, e.g. 110, 120, 130, or 150, across the network 140 to the QA system 100 which, in due course, replies with answers.

As described in more detail further below, the user enters natural language inputs or fragments 18 into one of the computer devices 110, 120, 130, or 150. In a conventional system, each of these fragments may be transmitted to the QA system 100 as separate questions. However, according to the illustrative embodiments, a question compiler 10 is interposed to queue and sort the user inputs 18 and then send them on to the QA system as questions 19. The compiler 10 thus, in accordance with the illustrative embodiments, performs a pre-processing role for the QA system 100, whereby individual user outputs are assembled into groups, each group intended to represent a coherent question. As schematically illustrated in FIG. 1, a succession of user inputs 18, labelled F1 to FN, are output from the user computer device 110, 120, 130, or 150, and then collated or compiled by the compiler 10, which outputs a succession of questions 19, labelled Q1, Q2, which may each consist of only one user input Fn or in other cases may consist of 2, 3, or more user inputs, e.g., F2 & F3 or F11, F12 and F13.

The QA system 100 receives and processes each question 19 by using natural language (NL) processing to analyze each question and extract question topic information contained in the question, such as named entities, phrases, and/or other specified terms which are stored in one or more domain dictionaries. By referring to a plurality of domain dictionaries relating to different domains or areas (e.g., travel, healthcare, electronics, game shows, financial services, or the like), words from different domains (e.g., "travel", "science", "sport", or the like) can be identified in each question based on their presence in the relevant domain dictionary. To this end, the QA system 100 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "What is tallest mountain in North America?" and to identify specified terms, such as named entities or phrases contained in the question. The process identifies key terms and attributes in the question and compares the identified terms to the stored terms in the domain dictionary.

The QA system 100 includes or has access to a computing device comprising one or more processors and one or more memories, and potentially any other computing device elements generally known in the art including buses, storage devices, communication interfaces, and the like. The QA system's computing device is operable to process questions received over the network 140. The questions are generated by users of further computing devices (e.g., 110, 120, 130, or 150), which are connected over the network 140 with each other and with other network devices or components via one or more wired and/or wireless data communication links, where each communication link may comprise one or more of wires, routers, switches, transmitters, receivers, or the like. In this networked arrangement, the QA system 100 and network 140 may enable question/answer (QA) generation functionality for one or more content users. Other embodiments of QA system 100 may be used with components, systems, sub-systems, and/or devices other than those that are depicted herein.

In the QA system 100, the knowledge manager 104 may be configured to receive inputs from various sources. For example, knowledge manager 104 may receive input routed through the network 140 from any one of various computing devices 110, 120, 130, 150, 160, 170, or other sources of data on the network 140. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, content is created and stored in an electronic document, which is incorporated into a corpus (i.e. a repository, collection, or the like) of electronic documents 107 and semantic data 108 within the knowledge base 106. The electronic documents 107 may include any file, text, article, or source of data (e.g., scholarly articles, dictionary definitions, encyclopedia references, and the like) for use by knowledge manager 104. The semantic data 108 is content based on the relation between signifiers, such as words, phrases, signs, and symbols, and what they stand for, their denotation, or connotation. Content users may access knowledge manager 104 via a network connection or an Internet connection to the network 140, and may input questions to knowledge manager 104 that may be answered by the content in the corpus of data. When a process evaluates a given section of a document for semantic content, the process can use a variety of conventions to query it from the knowledge manager.

One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing.

In one embodiment, the process sends natural language questions to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson QA system available from International Business Machines Corporation of Armonk, N.Y., which is augmented with the mechanisms of the illustrative embodiments described hereafter. The IBM Watson knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson QA system. The statistical model may then be used to summarize a level of confidence that the IBM Watson QA system has regarding the evidence that the potential response, i.e. candidate answer, is inferred by the question. This process may be repeated for each of the candidate answers until the IBM Watson QA system identifies candidate answers that surface as being significantly stronger than others and thus, generates a final answer, or ranked set of answers, for the input question. The QA system 100 then generates an output response or answer with the final answer and associated confidence and supporting evidence. More information about the IBM Watson QA system may be obtained, for example, from the IBM Corporation website, IBM Redbooks, and the like. For example, information about the IBM Watson QA system can be found in Yuan et al., "Watson and Healthcare," IBM developerWorks 2016 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, compact disc players, and the like. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. The nonvolatile data store can be a component that is external to the various information processing systems or can be internal to one of the information processing systems. An illustrative example of an information processing system showing an exemplary processor and various components accessed by the processor is shown in FIG. 2.

Figure 2:
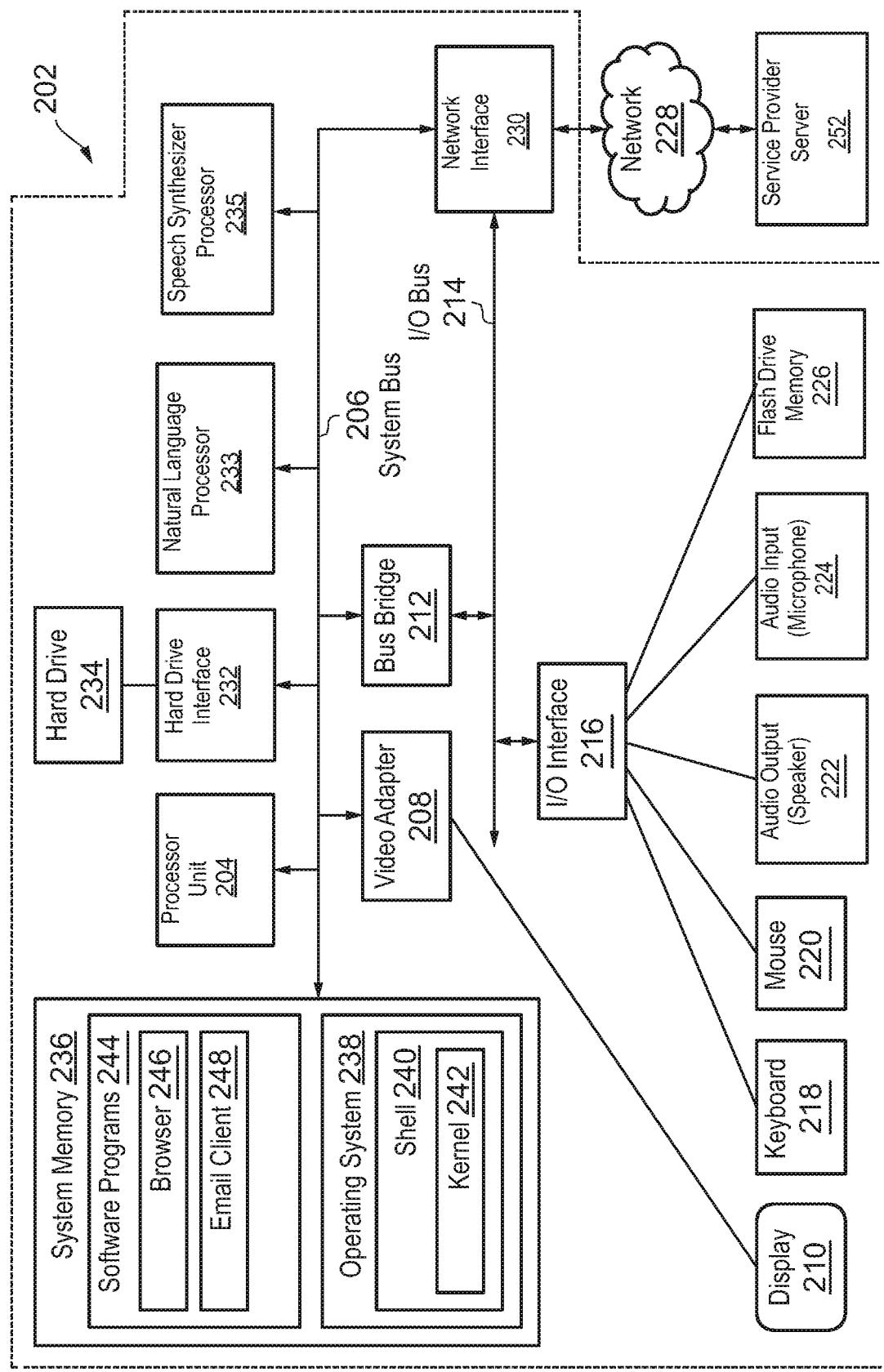
FIG. 2 is a simplified block diagram of an example information handling system capable of performing computing operations in accordance with one illustrative embodiment.

FIG. 2 is a simplified block diagram of an example information handling system capable of performing computing operations in accordance with one illustrative embodiment. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, an audio input (microphone) 222 for speech input, an audio output 224 for speech output, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244. Further processing capability may be provided in the form of a specialist natural language processor (NLP) 233 for converting speech input via audio input 222 to text. NLP 233 may be loaded with computer program that implements an automatic speech recognition (ASR) engine, for example. Still further processing capability may be provided by a speech synthesizer processor 235 for converting answers and other output data into speech for output via the audio output 224 or as an audio data file.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present disclosure can also support other user interface modes, such as graphical, voice, gestural, etc.

OS 238 also includes kernel 242, which includes lower levels of functionality for OS 238, including services required by other parts of OS 238 and software programs 244, including memory management, process and task management, disk management, mouse and keyboard management, and the like. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252.

The hardware elements depicted in the information processing system 202 are not intended to be exhaustive, but rather are representative to highlight components used by one or more of the illustrative embodiments. For instance, the information processing system 202 may include alternate memory storage devices such as magnetic cassettes, Digital Versatile Disks (DVDs), Bernoulli cartridges, and the like.

Figure 3:
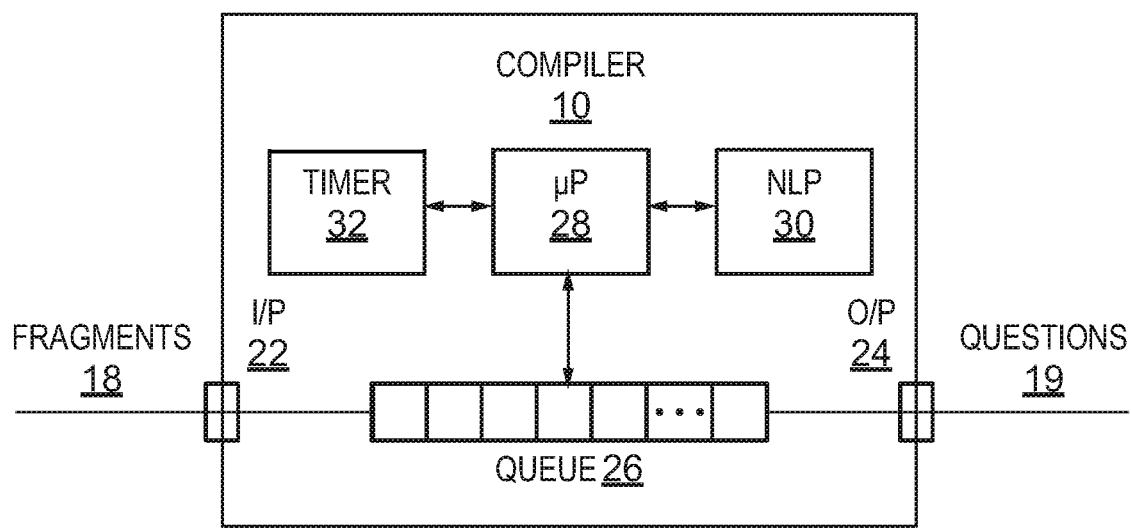
FIG. 3 is an example diagram of a question compiler in accordance with one illustrative embodiment.

FIG. 3 is an example diagram of a question compiler 10 in accordance with one illustrative embodiment. As shown in FIG. 3, user inputs or text fragments 18 are received at an input I/P 22 and questions 19 are output at output O/P 24. In between, the text fragments 18 are queued in a queue 26, for example a first-in-first-out (FIFO) queue, or other suitable queuing structure, where they are analyzed by a processor (μP) 28 which refers to a timer unit 32 and a natural language processor (NLP) 30. The processor 28 is operable to analyze the natural language fragments and assemble them into questions. Once a group of fragments held in the queue 26 has been determined to represent a single, whole question, or two or more whole questions, the queue 26 is emptied with those fragments being output respectively as a single question, or two or more questions, 19 from output 24. New fragments are then gathered in the queue 26 and the process repeats within the QA session. It will be understood that typically the overall computer program managing the QA session will have the question compiler 10 as a module, and will ensure that at the user end, further input is delayed until the current question or questions are answered, so that the QA session has a structured question and answer format. However, in other embodiments, the QA session management computer program may allow freedom to the user to continue to submit further inputs even when answers are being waited for. The compiler 10 is compatible with a typical question and answer cycle which can repeat any number of times within a single QA session as desired by the user. Within this cycle, the question compiler 10 repeatedly performs the role of assembling the inputs into questions and outputting them to the QA system 100.

In accordance with at least one illustrative embodiment, each assembly of a group of questions is carried out in the manner described hereafter. It is noted that, depending on the input timings and content, a group of questions may consist of only one question or two or more questions. The duration of an assembly is limited to an amount of time defined by a condition of when a threshold amount of time is reached, such as may be monitored by a timer. Reaching the time threshold is what triggers the question output. Processing of the inputs will typically take place on the fly, but may be delayed until the time threshold is reached (e.g., approximately 1.8 seconds in one example embodiment). In any case, it is reaching the time threshold which represents the end of a succession of inputs, and the freedom to output those inputs as one or more questions after the necessary analysis.

Monitoring the time is the role of the timer unit 32. It should be noted that the time threshold may be equivalently regarded as being a count up from zero to the threshold or a count down from the threshold to zero. Question assembly starts when the empty queue 26 (empty after the preceding output, or empty because the QA session has only just started) receives a first input of content-bearing natural language from the user, e.g., a first fragment 18 being received via input 22, which sets a start time for input analysis, i.e. sets the timer 32 running. The compiler 10 now waits until the timer 32 runs out (e.g., for up to 1.8 seconds in the previously mentioned example embodiment) to determine if the compiler 10 receives a further input of content-bearing natural language from the user. If a further input, e.g., another fragment 18, is received via input 22 before the timer 32 runs out (e.g., before 1.8 seconds in the example embodiment), then the start time is reset (e.g., to 1.8 seconds or another value as described with regard to other illustrative embodiments herein). The compiler 10 then waits to receive a still further input of content-bearing natural language, e.g., another fragment 18, from the user for up to the threshold amount of time.

As will be appreciated, if the user inputs all the text that he or she wants to as one rapid-fire input and then waits a long time with no action, then once the threshold time is reached that single input will be interpreted by the compiler as a single question and will be output as a question. On the other hand, in some cases, the user may make several inputs separated by relatively short time intervals which the compiler 10 then interprets to assess whether to group them and how to group them. Namely, if multiple inputs are received by the queue 26, the processor 28 makes pairwise comparisons between those inputs with reference to its natural language processor 30 (or in other illustrative embodiments to an external natural language processor) to determine if the inputs are semantically related. The processor 28 then groups any inputs determined to be semantically related into the same question 19.

Figure 4:
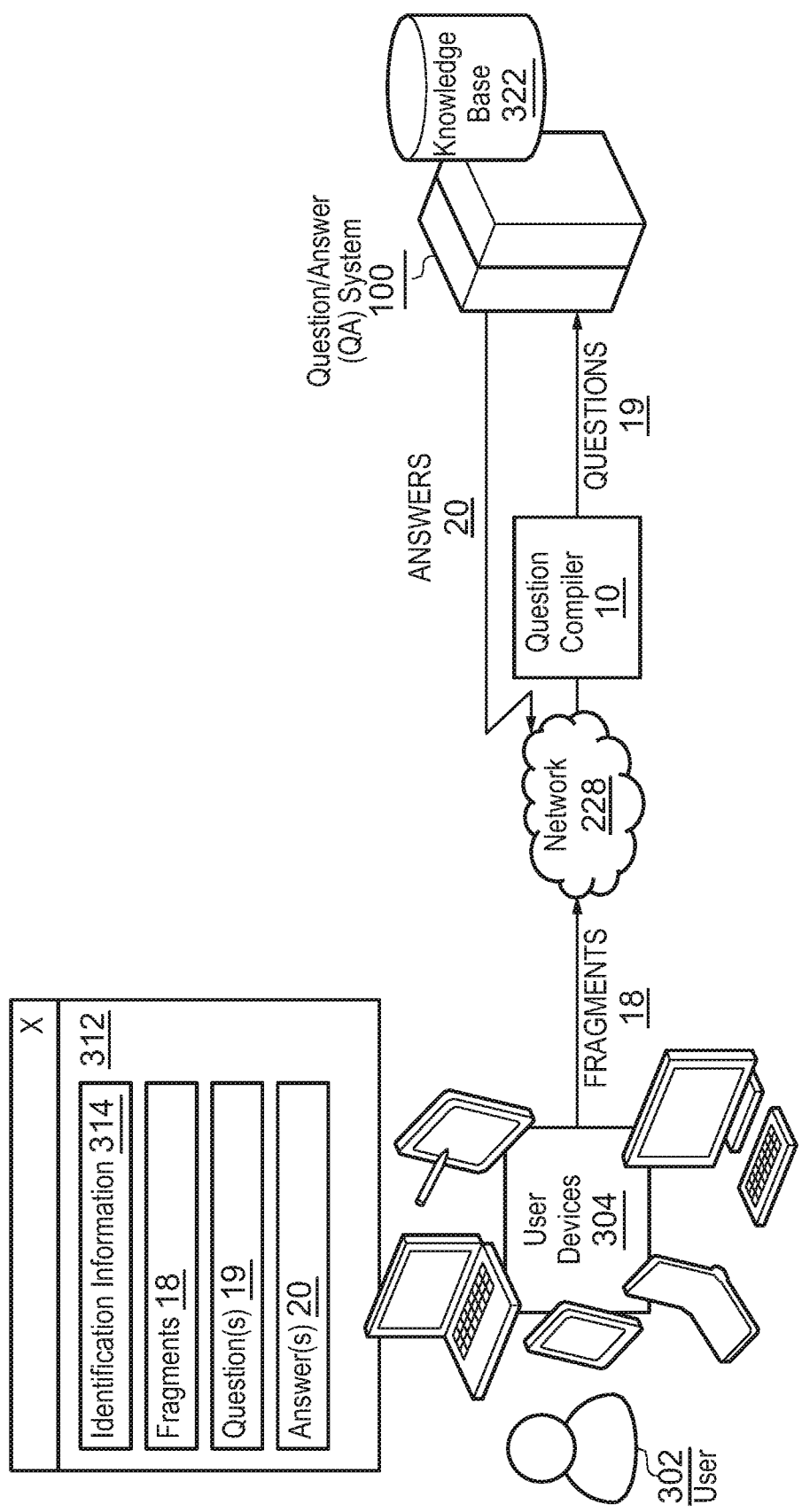
FIG. 4 is an example block diagram depicting a QA session between a user device and a QA system over a network connection in accordance with one illustrative embodiment.

FIG. 4 is an example block diagram depicting a QA session between a user device and a QA system over a network connection in accordance with one illustrative embodiment. As shown in FIG. 4, a user 302 communicates using a suitable user device 304 to run a QA session with a question/answer (QA) system 100 which it connects to via a network 228 and the question compiler 10. A user 302 interacts with a User Interface (UI) 312 associated with a user device 304 in order to manage inputs such as the user logging in initially, and then submitting questions, and outputs, such as receiving answers. The question compiler 10, which groups the user input fragments 18 into questions 19, is depicted in FIG. 4 as being interposed between the network 228 and the QA system 100. However, the skilled person will understand that the compiler 10 may be a network entity in the network 228, or a computer program module hosted in the user device 304 or the QA system 100, or distributed between them. The skilled person will also understand that direct user interaction with the QA system 100 with or without a network connection is possible in other embodiments. For example, the QA system 100 may be incorporated in a computing device with which the user can directly interact, e.g., by talking to that computing device, e.g., via a telecommunications link, or entering text input via a keyboard directly connected to the computing device hosting the QA system 100.

An answer 20 is generated by the QA system 100 in response to receiving a question 19 from the compiler 10. The QA system 100 parses the question 19 to extract the major features of the question 19. In turn, these features are then used to formulate queries that are applied to the corpus of data, such as a knowledge base 322, for example. Based upon the application of the queries to the corpus of data, a set of candidate answers (hypotheses) to the question 19 are generated. From the candidate answers, one is selected as being the most likely, or suitable, answer, which is the answer 20 that is communicated back to the user 302 that posed the question. The QA system 100 may also transmit the questions 19 back to the user device 304 to the extent that the user device 304 did not assemble the questions itself, e.g., if the questions were assembled by a separate compiler 10 as schematically illustrated, or a compiler 10 integrated with the QA system 100.

As used herein, a user device 304 refers to an information processing system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and the QA system 100 through the use of a network 228.

In various embodiments, the network 228 may be a public network, such as the Internet, a physical private network, a virtual private network (VPN), or any combination thereof. In certain embodiments, the network 228 may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on third, fourth or fifth generation (3G, 4G, 5G) wireless technologies including universal mobile telecommunications system (UMTS) and wideband code division multiple access (W-CDMA) and new radio (NR).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and 4G or 5G wireless technologies.

In various embodiments, user interaction with the QA system 100 is initiated by receiving user identification information 314 associated with a user 302. The type of user identification information 314, and the method by which it is received, is dependent upon the desired implementation. As an example, the user identification information 314 may include a user identifier (ID) and password associated with the user 302. As another example, the user identification information 314 may include the Internet Protocol (IP) address of a user device 304 being used by the user 302. In various embodiments, the user identification information 314 is entered by the user 302 into a User Interface (UI) window 312 associated with a user device 304 being used by the user 302.

Once the user identification information has been received, a question generated by the user 302 is then received by the QA system 100 for processing. In various embodiments, the QA system 100 may receive the question as a result of the user 302 entering inputs 18 within a UI window 312 of a user device 304 being used by the user 302. In certain embodiments, the QA system 100 may receive the inputs 18 and/or questions 19 through an application programming interface (API) associated with a user device 304 used by the user 302.

Each question 19 received from the compiler 10 is then processed by the QA system 100 to generate an answer 20, which is then provided to the user 302. In certain embodiments, the answers 20 are provided to the user 302 by the UI 312, which may be a graphical user interface (GUI) such as a window shown on the display. A time-stamped record of the QA dialog, including user identification information 314, may be generated and retained.

In the present description, references are made to semantic relationships being determined. It will be understood by those of ordinary skill in the art, in view of the present description, that semantic relationships can be determined, for example, by using semantic knowledge graphs to see the relationship between terms. Further details on semantic knowledge graphs can be found in McCusker & Chastain "What is a Knowledge Graph?" April 2016. It should be appreciated that other mechanisms for determining semantic relationships may be used without departing from the spirit and scope of the present invention.

Figure 5A:
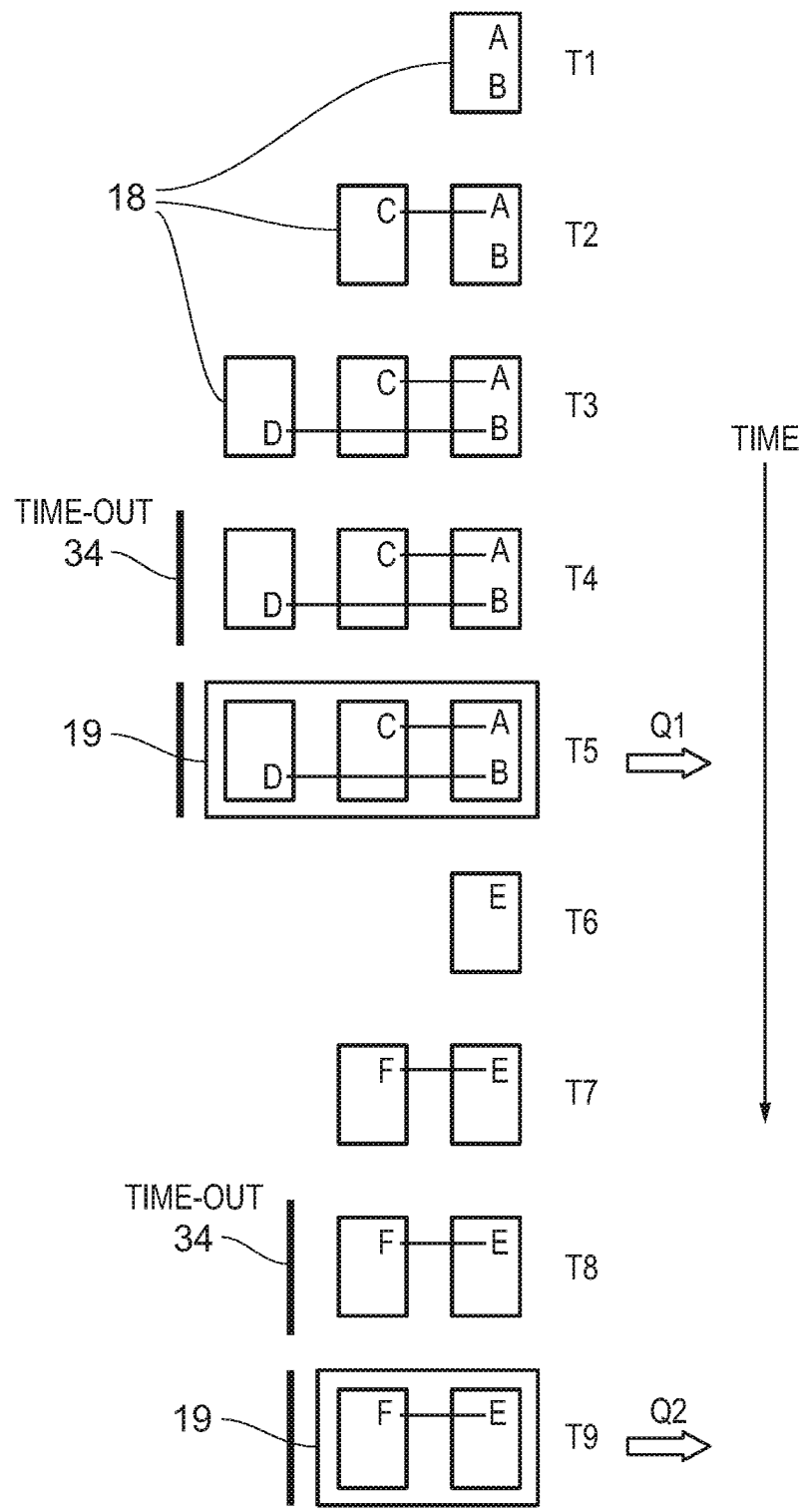
FIG. 5A is an example diagram illustrating an assembly of first and second questions, in accordance with one illustrative embodiment, for a first example.

FIG. 5A is an example diagram illustrating an assembly of first and second questions, in accordance with one illustrative embodiment, for a first example. Each input of content-bearing information, fragment 18 for short, is depicted by a rectangular "tablet". Time flows from the top to the bottom of the figure, showing the contents of the queue as the queue fills up. At each time, i.e. in each row of the figure, the queue 26 is filling from the left. In each fragment 18, the fragment's content is recognized by the processor 28 and/or NLP 30 as containing information, such as entity information and intent information. Intent is the action needed to take in response to a question. Entities are the subject matter of a question. Entity information may be sub-classified into, for example, persons, organizations, locations miscellaneous, or any other suitable entity classification for the desired implementation. As well as intent and entity information, a question may be interpreted to deduce a sentiment (e.g., positive or negative sentiment) and/or a tone (e.g., joy, anger, fear, sadness, disgust, or the like). The IBM Watson Tone Analyzer Service (e.g., v3 of 19 May 2016) may be used to detect tone from an input text in accordance with some illustrative embodiment, namely identifying tone such as emotional, social, and language based tone recognition. For example, if a negative tone is detected with slightly delayed responses over the average, the system may respond by increasing wait times when a negative sentiment is detected. A user who is upset may not respond as quickly as they may otherwise, so the emotional state of the user can be a factor when setting the wait time. A similar effect may occur when a dialog changes from one tone type to another. Another variable that may be factored in is length of user input relative to the time between inputs. This can be measured in terms of the number or words per minute or characters per minute that the user inputs compared with the number of words or characters per input.

In FIG. 5A, identified information in the fragments are denoted with capital letters in alphabetic order of input, i.e. A, B, C, etc. Further, in FIG. 5A, semantic relationships between information items are depicted with horizontal lines. Time outs, when the threshold time is reached, are depicted by bold vertical bars to the left of the immediately preceding fragment.

As shown in FIG. 5A, at time T1, the first fragment is received and is analysed. In the depicted example, from this analysis two items of information A and B are recognized. At time T2, the next fragment is received and a third information item C is found. Moreover, a semantic relationship between information A and C is determined, this relationship being depicted by the horizontal line interconnecting A and C. At time T3, a third fragment is received and a fourth information item D is identified and linked to information item B from the first fragment.

At time T4, there is a time out 34, i.e. the threshold time is met. Here it is noted this was not the case between the previous inputs, although not explicitly mentioned. The timeout triggers the processor 28 to batch up the queued fragments, in this case 3 fragments, into one or more questions. In this case, since all three fragments are semantically linked (1-2 and 1-3) they are grouped into a single question Q1.

At time T5, the queue 26 is emptied, which in this case involves outputting a single question Q1 composed of all the queued fragments. At time T6, a new assembly is started with receipt of a new fragment 18 which is determined to contain information E. At time T7, the next fragment is received and an information item F is found which is determined to have a semantic relationship to item E. At time T8, there is another time out 34. At time T9, E & F are grouped as a question and output as question Q2 to empty the queue 28.

Figure 5B:
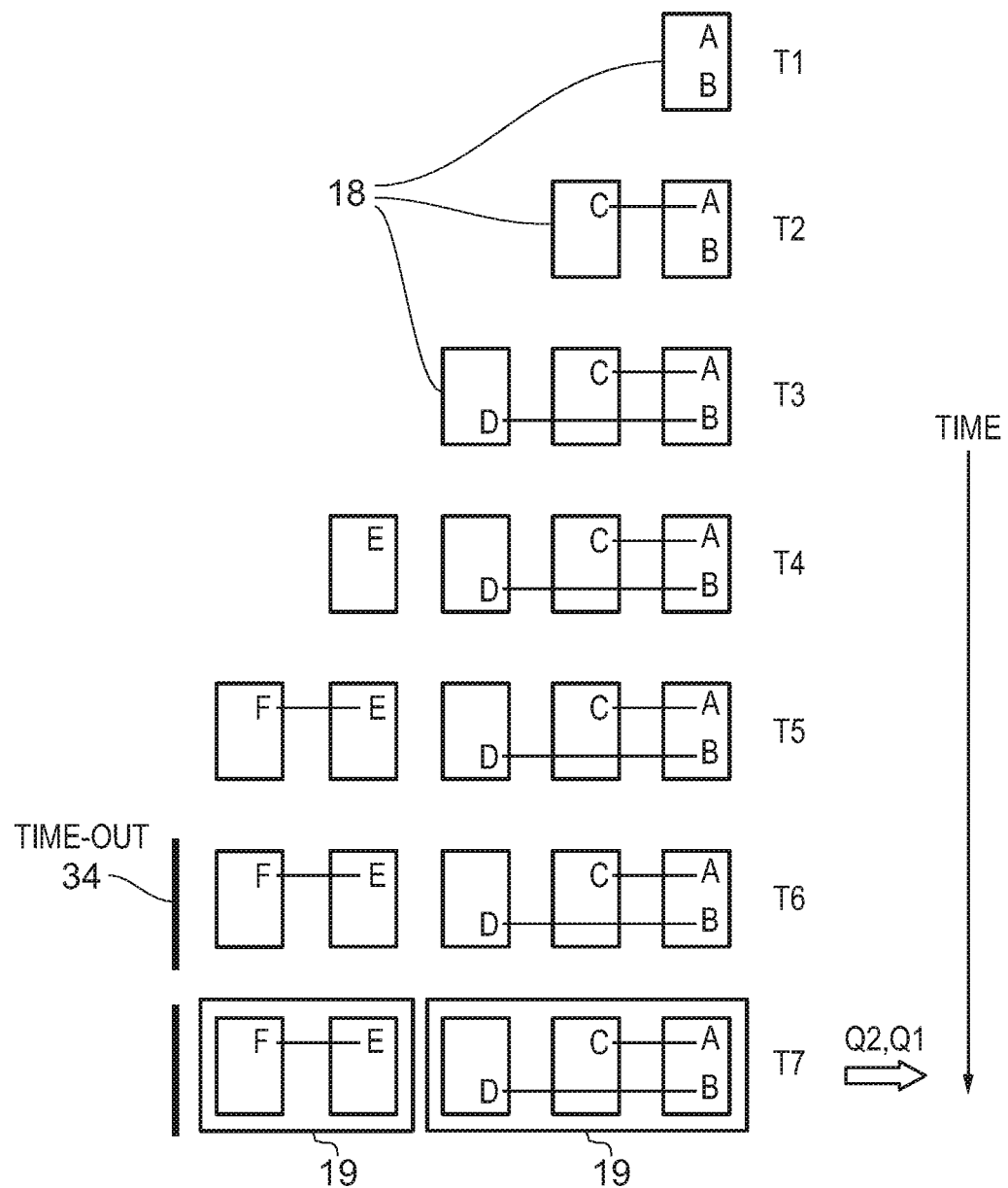
FIG. 5B shows an example diagram illustrating an assembly of first and second questions, in accordance with one illustrative embodiment, for a second example.

FIG. 5B shows an example diagram illustrating an assembly of first and second questions, in accordance with one illustrative embodiment, for a second example. The example of FIG. 5B differs from that of FIG. 5A primarily in that there is no time-out after inputting the fourth fragment, so the queue 26 continues to fill. In all other respects the input and the semantic relationships are the same as the example of FIG. 5A. As a consequence, when time-out 34 is reached, the queue contains five fragments. The semantic relationships that are determined result in the same grouping as the previous example, namely of the first to third fragments and the fourth and fifth fragments, so that two questions Q1 and Q2 are assembled. However, in this example these two questions are output together as part of the same queue emptying event.

Figure 6:
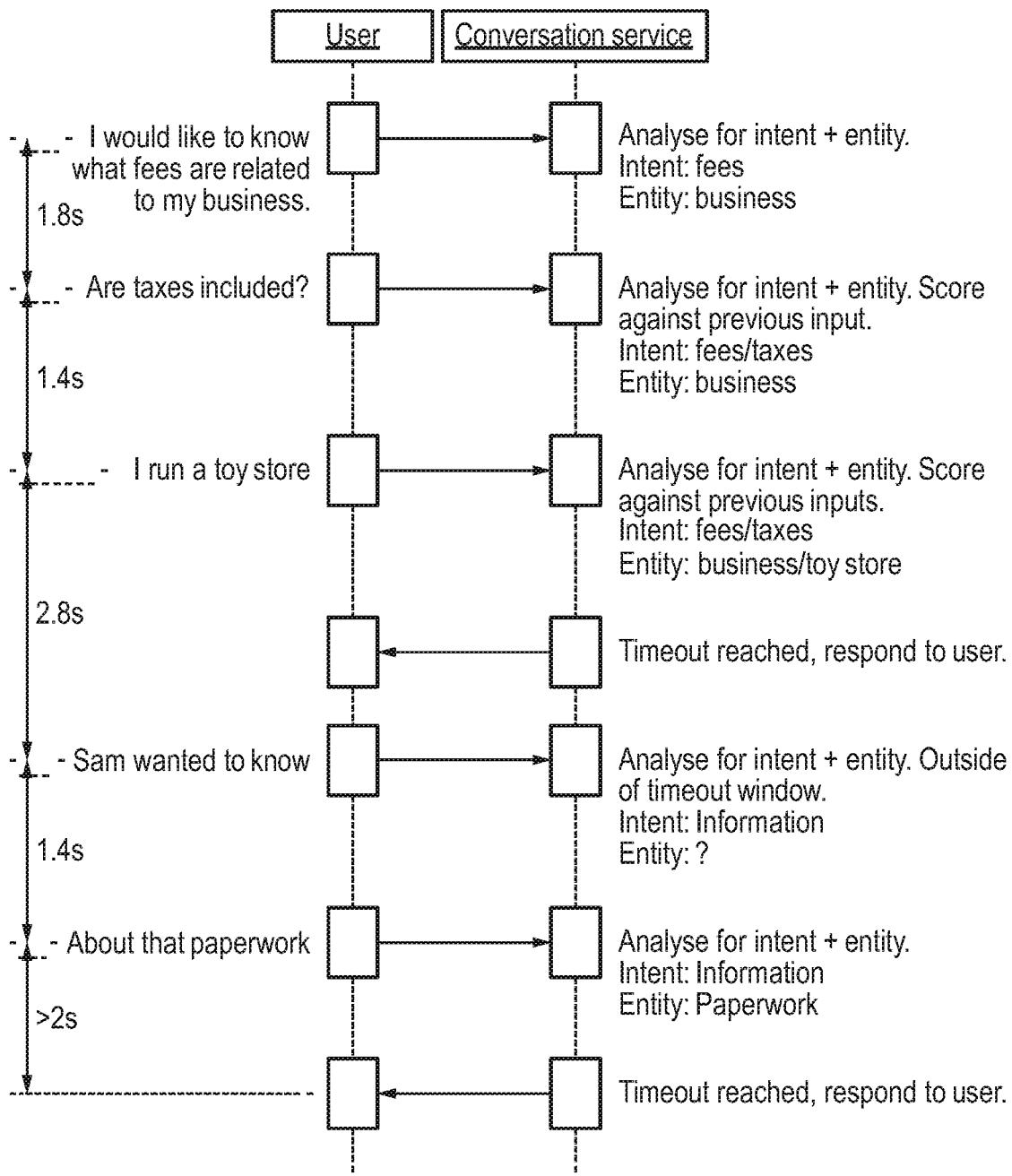
FIG. 6 shows a further example with specific natural language content in accordance with one illustrative embodiment.

FIG. 6 shows a further example with specific natural language content in accordance with one illustrative embodiment. In addition, the timings in real time are also shown as time differences between successive inputs. The left-hand column, labelled "User", shows user inputs at the user computer device, e.g., computing device 110, 120, 130, 150, or the like, and the right-hand column, labelled "Conversation service" shows actions of a QA system 100 with integrated question compiler 10, these actions being processing/analyzing actions and answer outputs.

The QA session starts with receiving a first input of content-bearing natural language from the user of: "I would like to know what fees are related to my business." This sets the monitoring time running against the threshold time which has been set (at least initially), in this example, to 2 seconds. This could, for example, be an average time between semantically related inputs that has been stored by the conversation service from previous sessions for this user. In the meantime, the conversation service analyses the input text and extracts an intent, "fees", and an entity, "business".

After a time of 1.8 seconds in this example, which is within the threshold, a further input is received "Are taxes included?", which resets the time counter. The conversation service analyses the input text and extracts an intent "taxes" and associates, through a semantic relation, the intent "taxes" in the current input with "fees" in the previous input. Moreover, the semantic relationship is not merely established as an abstract connection but is based on a threshold score being attained in a comparison of the current input with the previous input. That is, the determination of a semantic relationship existing between the two inputs is based on a confidence score of similarity between their respective contents and/or entities or intents extracted from their respective contents.

After a time of 1.4 seconds in the depicted example, which again is within the threshold, a further input is received "I run a toy store", which again resets the time counter. The conversation service analyses the input text and extracts an entity "toy store" and associates, through a semantic relation, the entity "toy store" in the current input with the entity "business" in the first input. This is again done on a scoring basis which takes account of the time-distance between the third and first inputs, i.e. 2 steps in numbers of inputs, or 3.7 seconds in real time.

The confidence score is compounded with elapsed time between the inputs in the sense that larger elapsed times reduce the confidence score. That is the confidence score threshold needed to result in a determination that there is a semantic relationship between the latest input and an earlier input is higher for an older input than a newer input. This weighting according to age can be implemented in a gradual fashion. In some illustrative embodiments, this gradual weighting may be, for example, providing a gradual percent reduction (e.g., 2%, 5%, 10% or 20% per input). For example, if there were a 10% reduction per input, and assuming that comparing the current input with the immediately previous input is given a weighting of 1.0, then comparing the current input with, for example, 3 inputs prior to the immediately previous input results in a weighting of 0.7 being applied, and no inputs older than 9 before the immediately previous input being considered. On the other hand, if a 25% reduction per input were applied, then no inputs older than 3 before the immediately previous input are considered. As an alternative to decrementing the weighting based on the numbering of inputs, this may be done based on real time, i.e. the real time difference between receipt of (or generation of) the two inputs being compared, for example. Other weighting schemes may also be applied in various illustrative embodiments without departing from the spirit and scope of the present invention.

Continuing with the depicted example of FIG. 6, there is no further user input for an amount of time, where that amount of time ends up being greater than the time threshold, namely there is no user input for 2.8 seconds, and thus, a time out is caused. The conversation service then processes the question with reference to a knowledge base to generate an answer. The answer is then sent to the user as a response, this answer being an answer to a question defined by all three inputs and their semantic relationships as determined to exist between the information content in each of the three inputs.

The input queue 26 is now empty and fresh input is received, namely the text: "Sam wanted to know." The conversation service determines that the intent is "information", but does not identify any entity. Optionally, the conversation service also checks for, but in this case does not find, any relation to the inputs from the previous question.

After a time of 1.4 seconds in the depicted example, a further input occurs of "About the paperwork." This is determined by the natural language processor to be a cataphora question linked to the previous input, such that the entity is "paperwork" and the intent is "information" and linked to the "information" of the previous input. Time out is reached and these two inputs are combined into a single question for the conversation service to respond to by sending an answer to the user.

The QA system 100, in the form of the conversation service in this example, is thus continually cross-referencing entities and intents it finds in the text inputs to determine if they have a sufficiently strong semantic relationship to bind the two text inputs together. On the other hand, if no such relationships are determined, the inputs are kept separate so that they can be posed to the QA system 100 as separate questions. Moreover, through weighting the similarity scoring with time based weighting values, the cross-referencing can be applied such that links to older inputs are harder to establish than to newer inputs, i.e. a stronger semantic relationship is needed to forge a link from the current input to an older input than to a newer input. By allowing cross-references back several steps, the process supports interpretation of user input when users are submitting two unrelated strands of questioning in parallel. Although this may seem unlikely, this is a detected characteristic of real human user input. In other embodiments, no age-related weighting is used, but instead cross-referencing is permitted up to a certain time limit, either as measured in real time from the present, e.g., 10, 20, 30, 40, 50 or 60 seconds, or in terms of a number of steps, e.g., 3, 4, 5, 6, 7, 8, 9 or 10.

As well as determining if there are any semantic relationships between any ones of the inputs in the current QA session, it may sometimes be appropriate to refer back to a previous QA session. For example, in multi-user conversation (chat), it may be deduced that a user coming back online into the conversation after a break may be referring back to the previous QA session when he/she was last participating in the chat. For example, if a user logs back into a chat and his/her first input is an indeterminate question, such as: "Was that OK?" then that question can be checked to see if it is anaphoric (in the narrow sense) back to the immediately previous QA session, as well as optionally also retaining the possibility that it may be cataphoric and will be linked to an about-to-be input text fragment.

It is noted that, to determine if a question is anaphoric, an anaphora candidate question may be analyzed with the semantic knowledge graph to determine if terms in one line (L1) have a relationship to those in the next line (L2). The combination of L1+L2 may be used to query the conversation system (referred to as "intents" in conversation) to see if the confidence of found intent is above a threshold. Scoring may then be used to choose between whether to link this input back to the previous QA session or forward to the next input in the current QA session.

Thus, the illustrative embodiments provide a computer-automated mechanism for user interaction with a QA system including a knowledge base. Natural language user inputs are queued and assembled into questions for the QA system by making pairwise comparisons between different inputs to determine if they are semantically related. Any related inputs are grouped into the same question for the QA system. The user's inputs are thus pre-processed to ensure that they are, where appropriate, bundled with other inputs, so that on average more cohesive questions are sent to the QA system, leading in turn to higher quality answers. The quality of conversation between a human and a robot can therefore be improved. The grouping is sensitive not only to interpretation of the content of the input text with natural language processing, but also to input timings. Namely, the system attempts to recognize interactively during sessions how long a given user separates inputs that are intended to belong to the same question, compared with adjacent inputs intended to be the last part of one question and the first part of the next.

It will be understood that embodiments of the present disclosure may be implemented using cloud computing. Specifically the QA system 100 and service provider server 252 may be hosted in the cloud and may in some illustrative embodiments, as already mentioned, incorporate the question compiler 10.

It is to be understood that although this disclosure includes a detailed description on cloud computing, implementation of the teachings recited herein are not limited to a cloud computing environment. Rather, illustrative embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
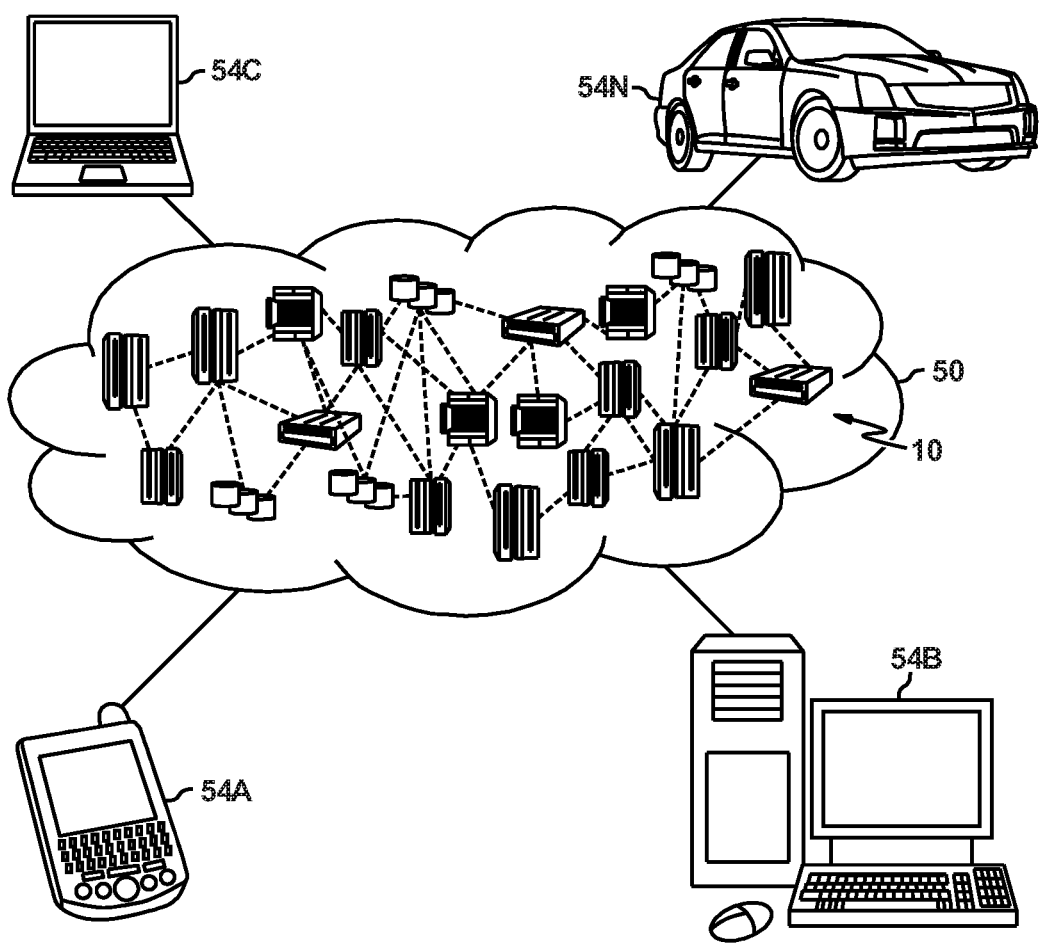
FIG. 7 depicts a cloud computing environment in accordance with one illustrative embodiment.

Referring now to FIG. 7, illustrative cloud computing environment 50 is depicted. As shown, cloud computing environment 50 includes one or more cloud computing nodes with which local computing devices used by cloud consumers, such as, for example, personal digital assistant (PDA) or cellular telephone 54A, desktop computer 54B, laptop computer 54C, and/or automobile computer system 54N may communicate. Nodes may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes and cloud computing environment 50 can communicate with any type of computerized device over any type of network and/or network addressable connection (e.g., using a web browser).

In particular, it will be appreciated that any of the various computer devices 110, 120, 130, 150, 160, 170, question compiler 10 and QA system 100 shown in FIG. 1, as well as any of the user devices 304, question compiler 10 and QA system 100 of FIG. 4, may correspond to said nodes and/or local computing devices 54A, 54B, 54C, 54N.

Figure 8:
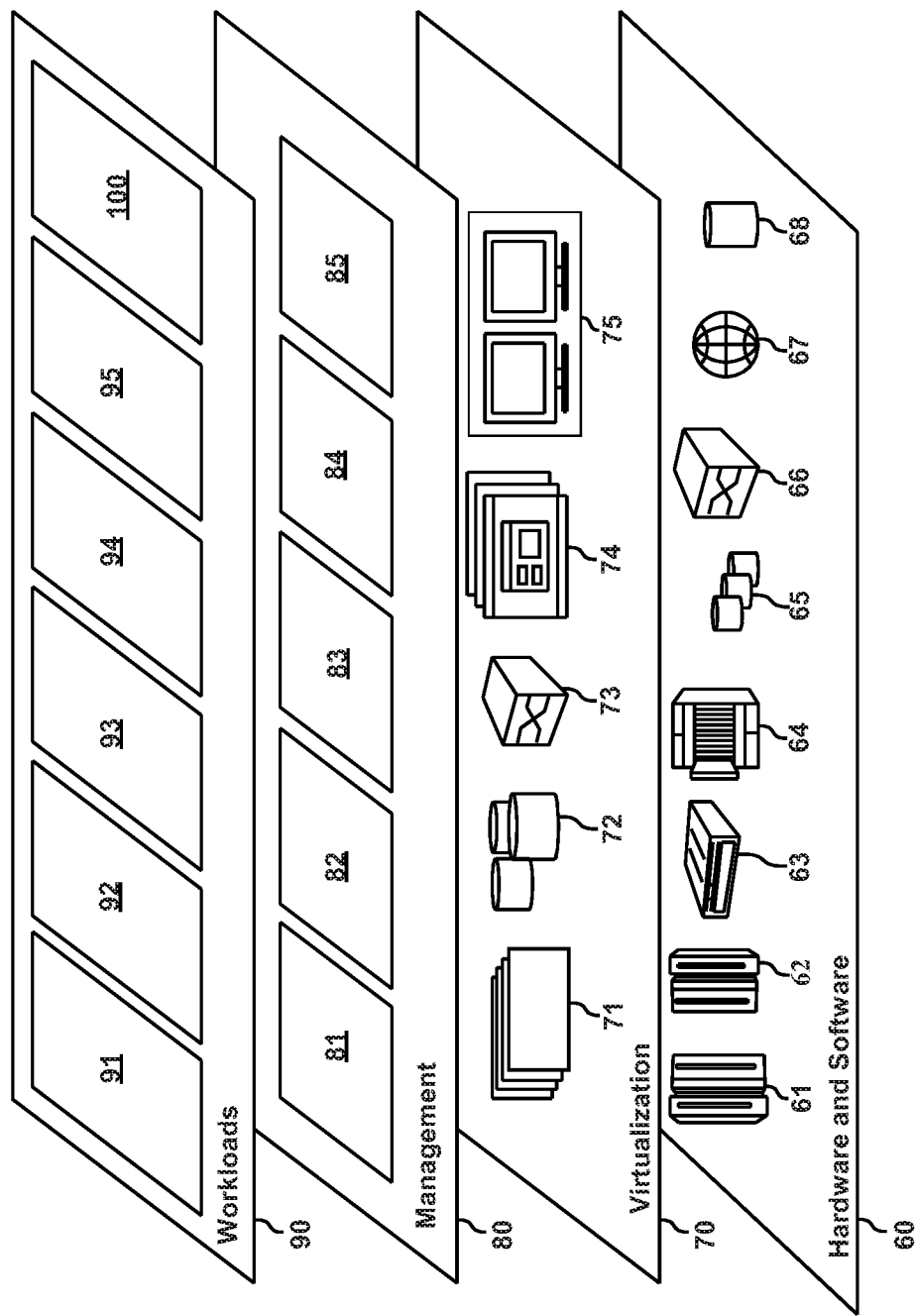
FIG. 8 depicts abstraction model layers in accordance with one illustrative embodiment.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

It will be appreciated that any of the various computer devices 110, 120, 130, 150, 160, 170, question compiler 10 and QA system 100 shown in FIG. 1, as well as any of the user devices 304, question compiler 10 and QA system 100 of FIG. 4, may correspond to physical or virtualized components in layers 60 and 70 respectively.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and QA system 100.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present disclosure may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the disclosure is a computer program product defined in terms of a system and method. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions which are executed by the processor to configure the data processing system to implement a question compiler for assembling natural language user inputs into questions for a question-and-answer (QA) system, the method comprising:

initializing, by the question compiler of the data processing system, a timer to a threshold amount of time;

receiving, in a queue of the question compiler, a first input of content-bearing natural language from a user computing device;

initiating, by the question compiler, running of the timer in response to receiving the first input of content-bearing natural language;

determining, by the question compiler, whether or not a second input of content-bearing natural language is received from the user computing device prior to the threshold amount of time being reached by the timer;

in response to receiving the second input of content-bearing natural language prior to the threshold amount of time being reached by the timer, grouping the second input with the first input to generate a question comprising content of both the first input and the second input, and resetting the running of the timer; and providing, by the question compiler, in response to the timer reaching the threshold amount of time without further input being received from the user computing device, the question to the QA system as an input question for processing by the QA system.

2. The method of claim 1, further comprising:

in response to one or more further inputs of content-bearing natural language being received by the question compiler prior to the timer reaching the threshold amount of time, comparing, by the question compiler, the one or more further inputs to each other or to the first and second inputs to determine if the one or more further inputs are semantically related to at least one of the first input or the second input; and grouping together, by the question compiler, each of the one or more further inputs with at least one of the first input or the second input that are determined to be semantically related to each other, to generate sets of grouped inputs, wherein providing the question to the QA system comprises outputting a group of questions to the QA system comprising at least one question, wherein each question in the group of questions is formed by one set of grouped inputs in the sets of grouped inputs.

3. The method of claim 2, wherein a determination of a semantic relationship between the one or more further inputs and at least one of the first input or the second input is based on a confidence score of similarity between contents of the one or more further inputs and contents of at least one of the first input or the second input.

4. The method of claim 3, wherein the confidence score is compounded with elapsed time between inputs being compared, wherein larger elapsed times between inputs being compared reduce the confidence score.

5. The method of claim 1, wherein the threshold amount of time is determined based on an analysis of an average time difference between reception times of inputs determined to belong to a single same question.

6. The method of claim 1, wherein the threshold amount of time is determined based on an analysis of an average time difference between reception times of pairs of inputs determined to be a last input associated with one question and a first input associated with a next question.

7. The method of claim 1, wherein the threshold amount of time is determined based on an analysis of an average time difference between reception times of inputs determined to belong to a single same question, and an average time difference between reception times of pairs of inputs determined to be a last input associated with one question and a first input associated with a next question.

8. The method of claim 1, wherein the threshold amount of time is determined based on at least one of a time of day, a user status, or a domain of questions.

9. The method of claim 2, further comprising:

in response to one or more further inputs being received by the question compiler prior to the timer reaching the threshold amount of time, comparing, by the question compiler, the one or more further inputs to previous inputs associated with previously generated questions in a same question-and-answer (QA) session between the user computing device and the QA system to determine if the one or more further inputs are semantically related to a previous input in the previous inputs; and in response to the one or more further inputs being semantically related to the previous input, associating the previous input with a group corresponding to a further input with which the previous input is semantically related.

10. The method of claim 2, further comprising:

in response to one or more further inputs being received by the question compiler prior to the timer reaching the threshold amount of time, comparing, by the question compiler, the one or more further inputs to previous inputs from a same user submitted during a previous question-and-answer (QA) session between the user computing device and the QA system to determine if the one or more further inputs are semantically related to a previous input in the previous inputs; and in response to the one or more further inputs being semantically related to the previous input, associating the previous input with a group corresponding to a further input with which the previous input is semantically related.

\* \* \* \* \*